(12) United States Patent
Strein et al.

(10) Patent No.: US 11,228,564 B2
(45) Date of Patent: Jan. 18, 2022

(54) HYBRID CLOUD-BASED MEDIA PRODUCTION

(71) Applicant: Disney Enterprises, Inc., Burbank, CA (US)

(72) Inventors: Michael J. Strein, Bohemia, NY (US); Zachary N. Toback, Montclair, NJ (US); Ryan N. McCormick, Blauvelt, NY (US); Craig L. Beardsley, Chicago, IL (US); Brian M. Kennedy, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 91 days.

(21) Appl. No.: 16/869,137

(22) Filed: May 7, 2020

(65) Prior Publication Data

US 2020/0404034 A1    Dec. 24, 2020

Related U.S. Application Data

(60) Provisional application No. 62/864,279, filed on Jun. 20, 2019.

(51) Int. Cl.
*H04L 29/06* (2006.01)
*H04L 12/24* (2006.01)
(Continued)

(52) U.S. Cl.
CPC .......... *H04L 63/0236* (2013.01); *G06F 9/455* (2013.01); *G06F 9/45533* (2013.01); *G06F 9/5011* (2013.01); *H04L 12/1868* (2013.01); *H04L 41/069* (2013.01); *H04L 43/04* (2013.01); *H04L 43/062* (2013.01); *H04L 47/82* (2013.01); *H04L 65/1016* (2013.01); *H04L 65/4076* (2013.01); *H04L 65/60* (2013.01); *H04L 65/602* (2013.01); *H04L 65/607* (2013.01);
(Continued)

(58) Field of Classification Search
None
See application file for complete search history.

(56) References Cited

U.S. PATENT DOCUMENTS 11,126,173 B2 *  9/2021  Cella .................... A01B 3/02
11,129,025 B1 *  9/2021  Yoskowitz .......... H04W 12/108
(Continued)

*Primary Examiner* — Dhairya A Patel
(74) *Attorney, Agent, or Firm* — Farjami & Farjami LLP

(57) ABSTRACT

A hybrid cloud-based media production system includes a facility extension platform having a hardware processor and a memory storing a software code. The hardware processor executes the software code to identify multicast production media flow(s) for processing in a cloud-based virtual production environment, to identify cloud-based resource(s) for processing one or more cloud production media flow(s) corresponding to the multicast production media flow(s), in the cloud-based virtual production environment, and to coordinate provisioning of the cloud-based virtual production environment with the identified cloud-based resource(s). The hardware processor also executes the software code to align, using a cloud permissible timing protocol, the timing of the cloud production media flow(s) in the cloud-based virtual production environment, and to process the cloud production media flow(s) in the cloud-based virtual production environment using the identified cloud-based resource(s).

20 Claims, 4 Drawing Sheets

(51) Int. Cl.
  *H04L 12/18* (2006.01)
  *G06F 9/455* (2018.01)
  *G06F 9/50* (2006.01)
  *H04L 12/911* (2013.01)
  *H04L 29/08* (2006.01)
  *H04L 12/26* (2006.01)
(52) U.S. Cl.
  CPC ............ *H04L 65/608* (2013.01); *H04L 67/10* (2013.01); *H04L 69/04* (2013.01)

(56) References Cited

U.S. PATENT DOCUMENTS

| | | |
|---|---|---|
| 2008/0279219 A1 | 11/2008 | Wu et al. |
| 2012/0030319 A1 | 2/2012 | Andries et al. |
| 2016/0381093 A1* | 12/2016 | Novo Diaz ............. H04L 41/12 370/270 |
| 2017/0331926 A1 | 11/2017 | Raveh et al. |
| 2019/0043207 A1* | 2/2019 | Carranza ................ G06K 9/325 |
| 2019/0141124 A1* | 5/2019 | Zhang ..................... H04L 45/16 |
| 2020/0107062 A1* | 4/2020 | Pichaimurthy ..... H04L 65/4084 |
| 2020/0145700 A1 | 5/2020 | Meyer |
| 2020/0236083 A1* | 7/2020 | Johns ................... H04L 9/3236 |
| 2020/0403972 A1 | 12/2020 | Strein et al. |
| 2020/0404033 A1 | 12/2020 | Strein et al. |
| 2020/0404034 A1 | 12/2020 | Strein et al. |
| 2020/0404035 A1* | 12/2020 | Strein ................. G06F 9/45533 |
| 2021/0250103 A1* | 8/2021 | Rippon ............... H04B 10/118 |

\* cited by examiner

HYBRID CLOUD-BASED MEDIA PRODUCTION

RELATED APPLICATION(S)

The present application claims the benefit of and priority to a Provisional Patent Application Ser. No. 62/864,279, filed Jun. 20, 2019, and titled "Cloud-Extensible Media Production," which is hereby incorporated fully by reference into the present application.

The present application is related to U.S. patent application Ser. No. 16/869,203, filed concurrently with the present application, and titled "Extensible Resource Management for Hybrid Cloud-Based Media Production"; U.S. patent application Ser. No. 16/869,236, filed concurrently with the present application, and titled "Media Flow Transport Security Management"; and U.S. patent application Ser. No. 16/800,853, filed on Feb. 25, 2020, and titled "Software Defined Network Orchestration to Manage Media Flows for Broadcast with Public Cloud Networks," which are hereby incorporated fully by reference into the present application.

BACKGROUND

Media-over-Internet Protocol, or media-over-IP, production facilities typically rely on multicast flow distribution to efficiently move media content, for which there are established production media flow carriage and management standards, as well as proprietary solutions. In traditional media-over-IP production environments, these standards and solutions for managing multicast production media flows are implemented using "on-premises" resources for which the production facility has control of the information technology (IT) architecture. As a result, a traditional media-over-IP production facility can provide the timing mechanisms required for the multicast production media flows, such as Precision Time Protocol (PTP) for example, and can manage the bandwidth, control, and routing for the multicast streams.

In cloud-based computing environments, by contrast, whether they are public or private, multicast flow management has typically been impermissible due in part to the unpredictable demands that multicast signals can place on cloud bandwidth. Instead, users of cloud-based IT resources are typically allocated computing and storage processes for which they are billed, as well as ingress or egress bandwidth, which they are also billed or allocated for. Due to the constraints imposed by use of cloud-based IT services, the media-over-IP architectures that work for a locally controlled production facility cannot be extended into the cloud. The unfortunate result is that defined production media flows from a local media-over-IP production facility cannot scale to cloud production media flows logically or seamlessly in the conventional art.

SUMMARY

There are provided hybrid cloud-based media production systems and methods, substantially as shown in and/or described in connection with at least one of the figures, and as set forth more completely in the claims.

DETAILED DESCRIPTION

Figure 1:
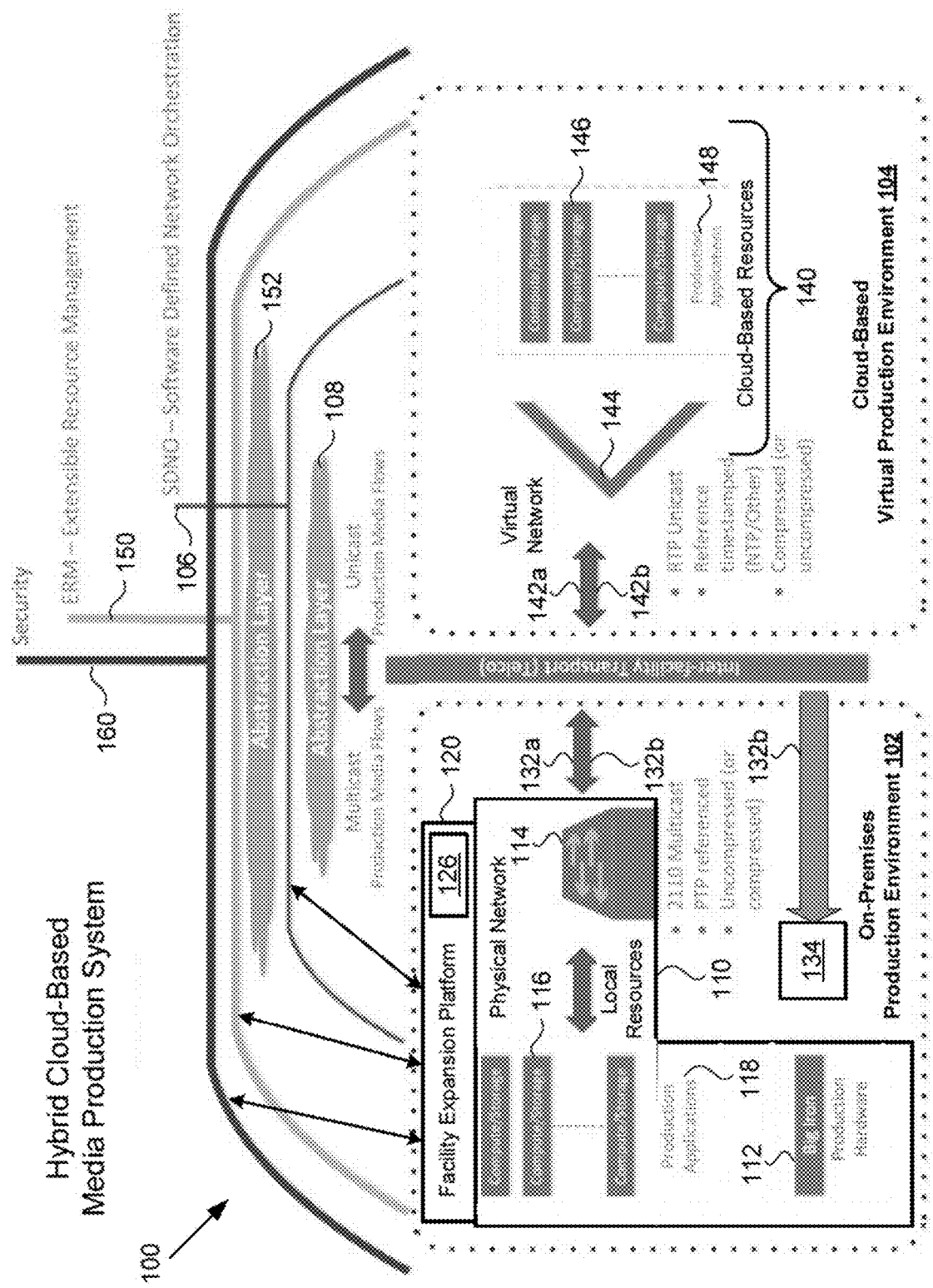
FIG. 1 shows a diagram of an exemplary hybrid cloud-based media production system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application describes a hybrid cloud-based media production solution that addresses and overcomes the drawbacks and deficiencies in the conventional art. In one implementation, the present solution provides a production facility expansion computing platform (hereinafter "facility expansion platform") configured to support a hybrid local/cloud-based production environment. The comprehensive control over management of the production media flows, commonly known as Software Defined Network Orchestration (hereinafter "SDNO") is performed by a software code resident on the facility expansion platform. That SDNO, as well as an extensible resource manager (hereinafter "ERM") controlled by the facility expansion platform, are configured to extend seamlessly between the local and cloud-based "virtual" production environments to enable a highly scalable and dynamic media-over-IP production solution.

It is noted that, as used in the present application, the expression "hybrid cloud-based media production" may refer to brick-and-mortar production facilities that are extensible into the cloud so as to include cloud-based virtual production resources, as well as to production systems relying entirely or substantially on virtual media processing resources. Consequently, the expressions "hybrid cloud-based media production" and "cloud-extensible media production" may be used interchangeably in the present disclosure. It is further noted that the hybrid cloud-based media production solution disclosed in the present application is cloud agnostic, i.e., not specifically designed for implementation in a particular type of cloud environment. Consequently, the cloud virtual production environment into which the present solution expands may include multiple distinct cloud environments, and thus may be a multi-cloud virtual production environment.

It is also noted that, in some implementations, the present hybrid cloud-based media production solution may be implemented as a substantially automated system. As used in the present application, the terms "automation," "automated," and "automating" refer to systems and processes that do not require the participation of a human user, such as a human production manager. Although, in some implementations, a human production manager may review, or even intervene, in the production decisions determined by the automated systems and according to the automated methods described herein, that human involvement is optional. Thus, in some implementations, the methods described in the present application may be performed under the control of hardware processing components of the disclosed systems.

FIG. 1 shows exemplary hybrid cloud-based media production system 100, according to one implementation. As shown in FIG. 1, hybrid cloud-based media production system 100 includes on-premises production environment 102 interactively linked with cloud-based virtual production environment 104. As shown in FIG. 1, on-premises production environment 102 includes local resources 110 generating multicast production media flows 132a and communicatively coupled to facility expansion platform 120. Local resources 110 include "big iron" production hardware 112, local physical production network 114, local computing and data storage resources 116, and local production applications 118. In addition, FIG. 1 shows SDNO 106, ERM 150, and media transport security service 160 hosted by facility expansion platform 120, as well as graphical user interface (GUI) 126 providing a production monitoring and/or control dashboard for an optional user of facility expansion platform 120. Also shown in FIG. 1 are abstraction layer 108 associated with SDNO 106 and abstraction layer 152 associated with ERM 150.").

With respect to abstraction layer 104 associated with SDNO 106, and abstraction layer 152 associated with ERM 150, it is noted that an abstraction layer is a series of software services (often called microservices) providing and accomplishing specific functions, as known in the art. Abstraction layer 104 supports both "east/west" lateral communications between other software services and "north/south" vertical communications between the layers that call these services for SDNO 106, while abstraction layer 152 provides analogous communications support for ERM 150.

Cloud-based virtual production environment 104 includes cloud-based resources 140 configured to receive and process cloud production media flows 142a corresponding to multicast production media flows 132a, thereby producing post-production cloud media flows 142b. As shown in FIG. 1, cloud-based resources 140 include cloud bandwidth 144, cloud-based computing and data storage resources 146, and cloud-based production applications 148. Also shown in FIG. 1 is physical, i.e., not cloud-based or virtual, post-production facility 134 receiving post-production multicast media flows 132b corresponding to post-production cloud media flows 142b.

It is noted that physical post-production facility 134 may be another production facility similar to on-premises production environment 102, or may be a media distribution hub, such as a regional affiliate or other affiliated media distributor. It is further noted that post-production multicast media flows 132b correspond to post-production cloud media flows 142b after post-production cloud media flows 142b are converted from a cloud permissible media flow type, such as unicast, to multicast. Cloud production media flows 142a are processed, resulting in post-production cloud media flows 142b, using cloud-based virtual production environment 104.

It is also noted that "multicast" is a term used to describe communication in which a piece of information is sent from one or more points to a set of other points. In this case there may be one or more senders, and the information is distributed to a group of receivers. One example of an application which may use multicast is a video server sending out networked television (TV) channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. IP multicast provides dynamic many-to-many connectivity between a set of senders (at least 1) and a group of receivers.

The format of an IP multicast packet is identical to that of unicast packets and is distinguished by the use of a special class of destination address (i.e., class D IPv4 address), which denotes a specific multicast group. Since Transmission Control Protocol (TCP) supports only the unicast mode, multicast applications must typically use the User Datagram Protocol (UDP) transport protocol. Unlike broadcast transmission, which is used on some local area networks (LANs), multicast clients receive a stream of packets only if they have previously elected to do so, for example by joining the specific multicast group address. Membership of a group may be dynamic and may be controlled by the receivers, which are informed by the local client applications. The routers in a multicast network learn which sub-networks have active clients for each multicast group and attempt to minimize the transmission of packets across parts of the network for which there are no active clients. The multicast mode is useful if a group of clients require a common set of data at the same time, or when the clients are able to receive and store common data until needed. Where there is a common need for the same data required by a group of clients, multicast transmission may provide significant bandwidth savings, for example, up to 1/N of the bandwidth compared to N separate unicast clients.

As noted above, in cloud-based computing environments, whether they are public or private, multicast flow management has typically been impermissible due in part to the unpredictable demands that multicast signals can place on cloud bandwidth. However, it is contemplated that cloud-based virtual production environment 104 may evolve to accommodate multicast flow management. Consequently, in some implementations cloud production media flows 142a and post-production cloud media flows 142b may be multicast media flows. Nevertheless, most present use cases require conversion of multicast production media flows 132a into unicast production media flows prior to processing in cloud-based virtual production environment 104. Thus, in some implementations, cloud production media flows 142a may be unicast production media flows 142a, and post-production cloud media flows 142b may be post-production unicast media flows 142b.

It is noted that in use cases in which multicast media flows are permissible in cloud-based virtual environment 104, the correspondence between cloud production media flows 142a and multicast production media flows 132a, as well as the correspondence between post-production multicast media flows 132b and post-production cloud media flows 142b may be one-to-one. However, in use cases in which multicast media flows are impermissible in cloud-based virtual environment 104, the correspondence between cloud production media flows 142a and multicast production media flows 132a may be many-to-one, while the correspondence between post-production multicast media flows 132b and post-production cloud media flows 142b may be one-to-many.

In contrast to multicast, "unicast" is a term used to describe communication in which a piece of information is sent from one point to another point. In this case there is just one sender and one receiver. Unicast transmission, in which a packet is sent from a single source to a specified destination, is a predominant form of transmission on LANs and within the Internet. All LANs, such as Ethernet, for example, as well as IP networks, support the unicast transfer mode. Examples of the standard unicast applications supported by LANs and IP networks include Hypertext Transfer Protocol (HTTP), Simple Mail Transfer Protocol (SMTP), File Transfer Protocol (FTP), and Telnet, each of which employs TCP.

Hybrid cloud-based media production system 100 provides an exemplary framework by which on-premises production environment 102 can scale larger by expanding into cloud-based virtual production environment 104. That expansion may include the following:

1) Media-over-IP multicast production media flows 132$a$ are converted to unicast or other cloud permissible production media flows 142$a$ as they move into cloud-based virtual production environment 104.

2) SDNO 106 hosted by facility expansion platform 120 extends into cloud-based virtual production environment 104 from on-premises production environment 102 to manage cloud production media flows 142$a$ in cloud-based virtual production environment 104, creating a virtual network managing the bandwidth and allocation of cloud production media flows 142$a$, as well as the announcement and discovery of cloud-based resources 140. In other words, SDNO 106 enables cloud-based resources 140 for required production processes and manages the connections. In one implementation, this would be accomplished by the cloud providers supplying standard application programming interfaces (APIs) to cloud-based resources 140.

3) ERM 150 hosted by facility expansion platform 120 coordinates and books cloud-based resources 140 required by the media workflows, spinning up computing and storage processes as needed, and loading the required applications. ERM 150 can additionally manage the licenses for the applications, should additional applications be required. ERM management of cloud-based resources 140 and licensing may be API-based such that ERM 150 can present a media based dashboard to a user via GUI 126, while allocating the appropriate resources from the cloud provider.

Figure 2:
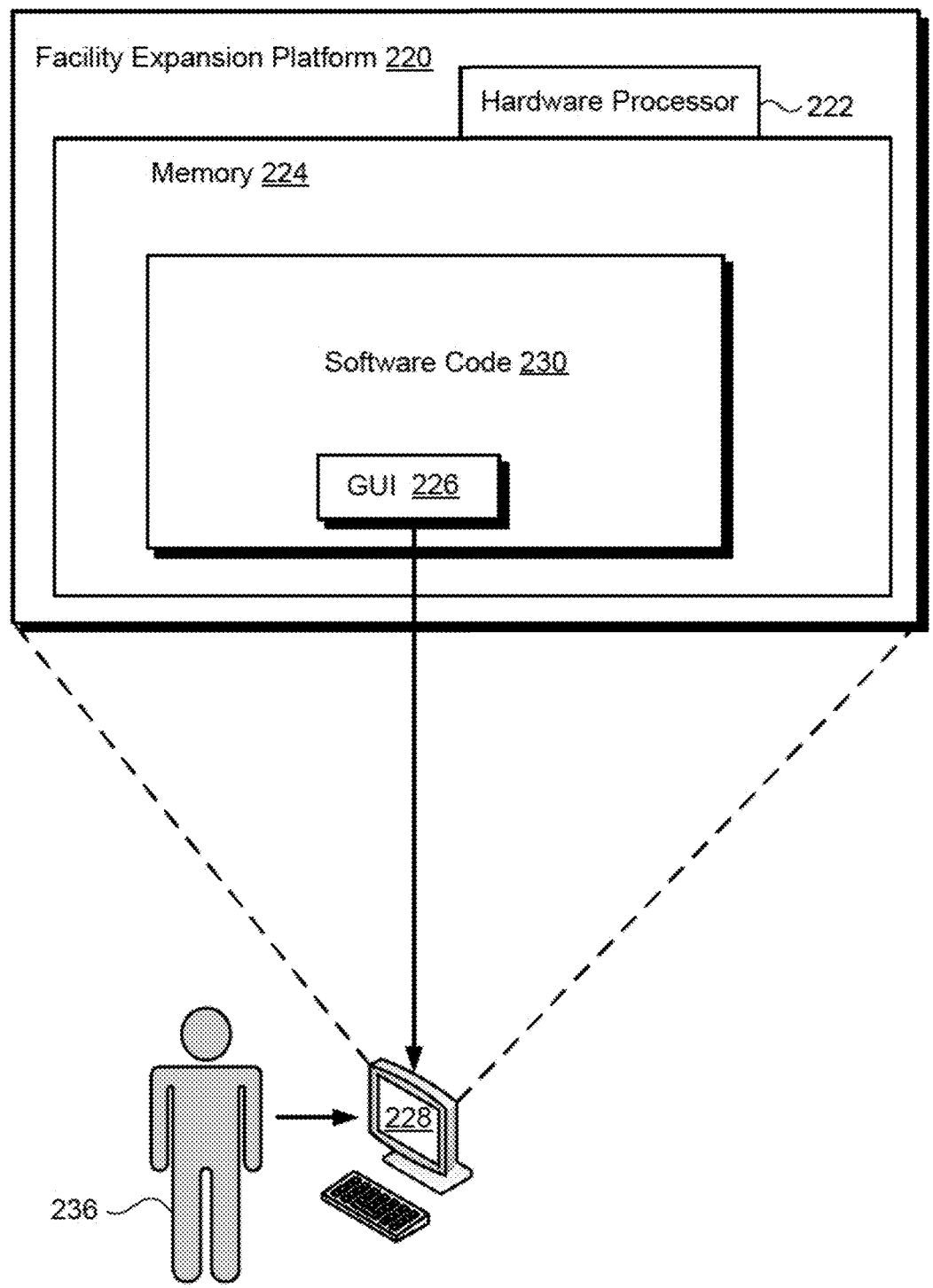
FIG. 2 shows a diagram of a facility extension platform suitable for use in the system of FIG. 1, according to one implementation.

FIG. 2 shows a diagram of exemplary facility extension platform 220, according to one implementation. As shown in FIG. 2, facility extension platform 220 includes hardware processor 222, memory 224 implemented as a non-transitory storage device, and display 228. According to the present exemplary implementation, memory 224 stores software code 230, which may be configured to control SDNO 106, ERM 150, and media transport security service 160, in FIG. 1, for example. In addition, software code 230, when executed by hardware processor 222, can present GUI 226 to optional system user 236 via display 228.

Facility extension platform 220 and GUI 226 correspond respectively in general to facility extension platform 120 and GUI 126, in FIG. 1. As a result, facility extension platform 220 and GUI 226 may share any of the characteristics attributed to respective facility extension platform 120 and GUI 126 by the present disclosure, and vice versa. That is to say, as noted above, software code 230 of facility extension platform 120/220 may be configured to control SDNO 106, ERM 150, and media transport security service 160. Moreover, like GUI 126, GUI 226 can provide a production monitoring and/or control dashboard for system user 236.

It is noted that, although the present application refers to software code 230 as being stored in memory 224 for conceptual clarity, more generally, memory 224 may take the form of any computer-readable non-transitory storage medium. The expression "computer-readable non-transitory storage medium" as used in the present application, refers to any medium, excluding a carrier wave or other transitory signal that provides instructions to hardware processor 222 of facility extension platform 120/220. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 2 depicts software code 230 as being stored as a single software module in memory 224, that representation is also provided merely as an aid to conceptual clarity. More generally, facility extension platform 120/220 may include one or more computing platforms, such as computer servers or computer work stations for example, which may be co-located, or may form an interactively linked but distributed network for instance.

As a result, hardware processor 222 and memory 224 may correspond to distributed processor and memory resources. Thus, it is to be understood that software code 230 may be stored and/or executed using the distributed memory and/or processor resources of facility extension platform 120/220. Facility extension platform 120/220 may correspond to one or more web servers, accessible over a packet-switched network such as the Internet, for example. Alternatively, facility extension platform 120/220 may correspond to one or more computer servers supporting a wide area network (WAN), a LAN, or included in another type of limited distribution or private network.

Although when implemented as a computer workstation, facility extension platform 120/220 may take the form of a desktop computer, as depicted in FIG. 2, that representation is also provided merely as an example. More generally, facility extension platform 120/220 may be any suitable mobile or stationary computing device or system that implements data processing capabilities sufficient to provide GUI 126/226, support connections to SDNO 106, ERM 150, and media transport security service 160, and implement the functionality ascribed to facility extension platform 120/220 herein. For example, in other implementations, facility extension platform 120/220 may take the form of a laptop computer, tablet computer, or smartphone, for example.

User 236 may utilize GUI 126/226 of facility extension platform 120/220 to review the performance of hybrid cloud-based media production system 100 as described in one or more reports generated by software code 230. Such reports may include performance and/or financial metrics. For example, in some implementations the reports generated by software code 230 may reveal the profitability or return-on-investment (ROI) of media content in the form of TV programming content or feature film content produced using hybrid cloud-based media production system 100 based on billing and licensing information obtained from ERM 150.

It is noted that, in various implementations, the reports generated using software code 230 may be stored in memory 224 and/or may be copied to non-volatile storage. Alternatively, or in addition, and as noted above, in some implementations those reports may be displayed to system user 136 via display 228 of facility extension platform 120/220 and GUI 126/226.

With respect to display 228 of facility extension platform 120/220, display 228 may be physically integrated with facility extension platform 120/220 or may be communicatively coupled to but physically separate from facility extension platform 120/220. For example, where facility extension platform 120/220 is implemented as a smartphone, laptop computer, or tablet computer, display 228 will typically be integrated with facility extension platform 120/220. By contrast, where facility extension platform 120/220 is implemented as a desktop computer, display 228 may take the form of a monitor separate from facility extension platform 120/220 in the form of a computer tower. Moreover, display 228 may be implemented as a liquid crystal display (LCD), a light-emitting diode (LED) display, an organic light-emitting diode (OLED) display, or any other suitable display screen that performs a physical transformation of signals to light.

It is noted that in public cloud environments, the cloud host provider may work with the media applications. SDNO 106, and ERM 150 to present to on-premises production environment 102 based system user 236 a hybrid but apparently seamless production environment. Standards and specifications such as Networked Media Open Specifications (NMOS) that define the methods for discovery, bandwidth reservation, and the like can be used to establish the framework to create this hybrid architecture, and enable ERM 150 and SDNO 106 to establish the features required for a dynamic environment. As a result, SDNO 106 and ERM 150 would present to the user a seamless environment in which it is impossible, or nearly so, to distinguish where on-premises production environment 102 ends and cloud-based virtual production environment 104 begins.

Figure 3:
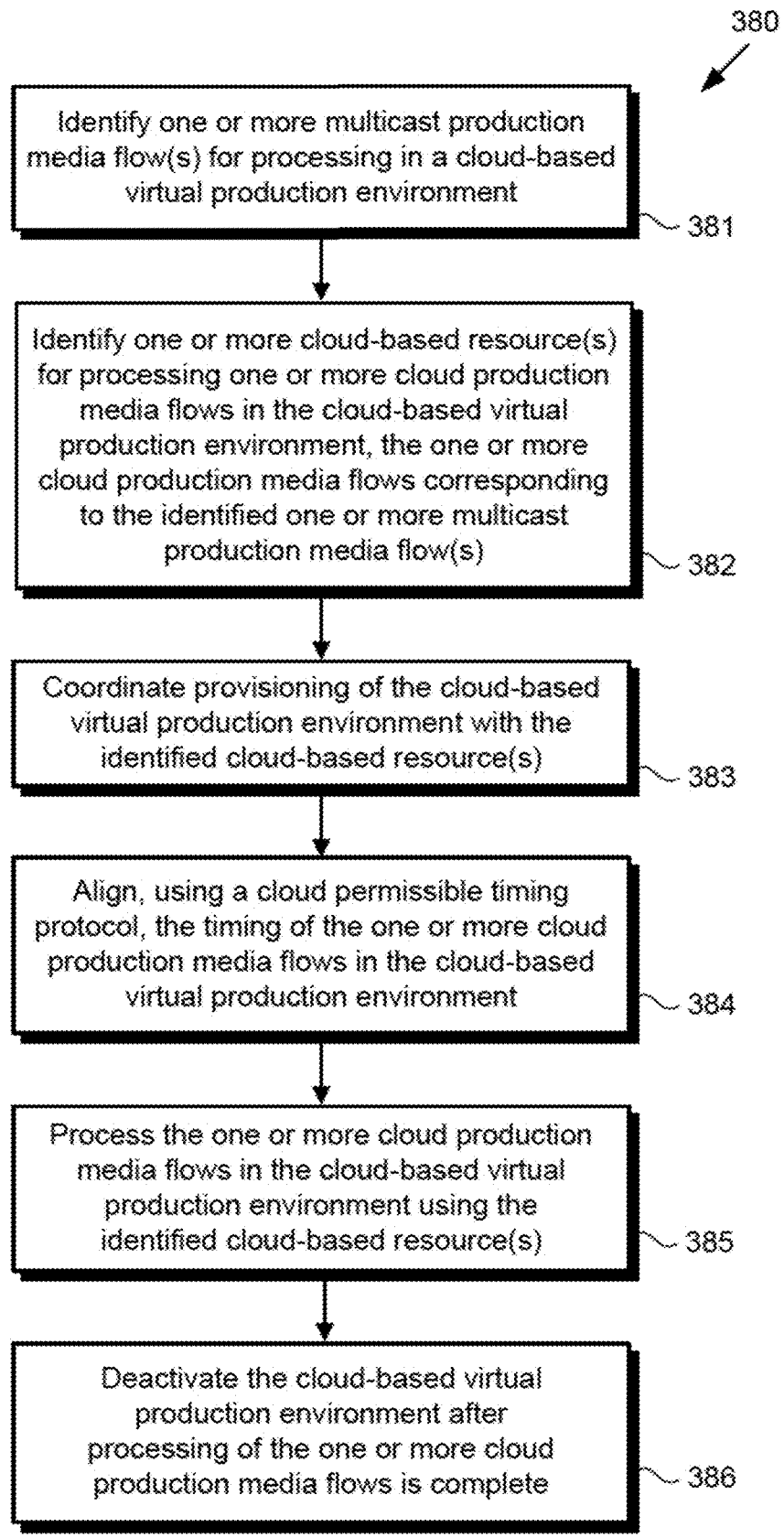
FIG. 3 shows a flowchart presenting an exemplary method for use by a system for performing hybrid cloud-based media production, according to one implementation.

The functionality of hybrid cloud-based media production system 100 will be further described by reference to FIG. 3 in combination with FIGS. 1 and 2. FIG. 3 shows flowchart 380 presenting an exemplary method for use by a system for performing hybrid cloud-based media production, according to one implementation. With respect to the method outlined in FIG. 3, it is noted that certain details and features have been left out of flowchart 380 in order not to obscure the discussion of the inventive features in the present application.

Referring to FIGS. 1 and 3 in combination, flowchart 380 begins with identifying one or more multicast production media flows 132a for delivery into cloud-base virtual production environment 104 (action 381). Multicast production media flows 132a may include streaming audio content, streaming video content, streaming audio-video content, graphics, or one or more media files, to name a few examples. Where multicast production media flows 132a include video, they may take the form of camera feeds or remote feeds, for example.

Action 381 may be triggered by workflow requirements, such as turnaround time or scheduling, by resource constraints imposed by local resources 110, or may be scheduled to occur at predetermined intervals (e.g., daily, weekly, monthly, etc.), for example. Referring to FIG. 2, with continued reference to FIGS. 1 and 3, action 381 may be performed by software code 230, executed by hardware processor 222 of facility expansion platform 120/220, and using SDNO 106.

Where multicast production media flows 132a originate in on-premises production environment 102, the timing protocol applied to multicast production media flows 132a may be incompatible with timing schemes permitted in the cloud. For example, timing of multicast production media flows 132a may be controlled in on-premises production environment 102 using Precision Time Protocol (PTP), which is known in the art, but which is typically impermissible in cloud-based virtual production environment 104. However, it is contemplated that cloud-based virtual production environment 104 may evolve to support use of PTP. Consequently, in some implementations one or more multicast production media flows 132a may have a timing protocol that is impermissible in cloud-based virtual production environment 104, while in other implementations the timing protocol used for one or more multicast production media flows 132a may be permitted in cloud-based virtual production environment 104.

Flowchart 380 continues with identifying one or more of cloud-based resources 140 for processing one or more cloud production media flows 142a in cloud-based virtual production environment 104, where one or more cloud production media flows 142a correspond to, and may be converted from, one or more multicast production media flows 132a identified in action 381 (action 382). It is noted that, in some implementations, conversion of one or more multicast production media flow(s) 132a into one or more cloud production media flows 142a may be performed by software code 230, executed by hardware processor 222 of facility extension platform 120/220. However, in other implementations, that conversion may be performed by a host provider supplying cloud-based resources 140, or by an independent third-party provider of multicast to cloud conversion services.

Conversion of one or more multicast production media flows 132a into one or more cloud production media flows 142a is typically performed before delivery of one or more cloud production media flows 142a into cloud bandwidth 144 of cloud-based virtual production environment 104. Conversion of one or more multicast production media flows 132a/332a into one or more cloud production media flows 142a/342a may include aliasing, performing Network Address Translation (NATing), or some other form of IP address translation to convert one or more multicast production media flows 132a/332a into unicast production media flows, or into any other IP transmission format permissible in cloud-based virtual production environment 104/304. Identification of cloud-based resources 140 needed to process one or more cloud production media flows 142a may be performed by software code 230, executed by hardware processor 222 of facility expansion platform 120/220, and using SDNO 106.

Flowchart 380 continues with coordinating provisioning of cloud-based virtual production environment 104 with the one or more cloud-based resources 140 identified as needed for processing one or more cloud production media flows 142a in action 382 (action 383). Coordinating the provisioning of cloud-based virtual production environment 104 with cloud-based resources 140 may include one or more of reserving cloud bandwidth 144, ordering cloud-based computing and data storage resources 146, or ordering cloud-based production applications 148, for example. In addition, coordinating the provisioning of cloud-based resources 140 may include obtaining any licensing required for use of cloud-based resources 140. Action 383 may be performed by software code 230, executed by hardware processor 222 of facility expansion platform 120/220, and using ERM 150.

Flowchart 380 continues with aligning one or more cloud production media flows 142a using a cloud permissible (or "cloud friendly") timing protocol, in cloud-based virtual production environment 104 (action 384). As noted above, in on-premises production environment 102, PTP may be used in media-over-IP to align multicast production media flow(s) 132a. In order to achieve analogous timing in cloud-based virtual production environment 104 in implementations in which use of PTP is not permitted there, one or more cloud production media flows 142a must be buffered, as well as being timed using a cloud friendly timing protocol, such as Network Time Protocol (NTP) for example.

It is noted that as production media flows are converted from multicast production media flow(s) 132a to cloud production media flows 142a, they may come through different network paths, resulting in wander and jitter that causes cloud production media flows 142a to move out of time with one another. Because production processing of cloud production media flows 142a is to be performed in cloud-based virtual production environment 104, alignment of cloud production media flows 142a must typically be done after their delivery into cloud-based virtual production environment 104. Alignment of one or more cloud production media flows 142a using a cloud permissible timing protocol in action 384 may be performed by software code 230, executed by hardware processor 222 of facility extension platform 120/220, and using SDNO 106.

Flowchart 380 continues with processing one or more cloud production media flows 142a in cloud-based virtual production environment 104 using the one or more cloud-based resources 140 identified in action 382, resulting in one or more post-production cloud media flows 142b (action 385). Processing of one or more cloud production media flows 142a in cloud-based virtual production environment 104 may be performed by software code 230, executed by hardware processor 222 of facility expansion platform 120/220, and using SDNO 106.

In some implementations, the method outlined by flowchart 380 may conclude with action 385 described above. However, and as shown in FIG. 3, in other implementations, flowchart 380 can continue and conclude with deactivating cloud-based virtual production environment 104 after processing of one or more cloud production media flows 142a is complete (action 386). Action 386 results in effective withdrawal of hybrid cloud-based media production system 100 from cloud-based virtual production environment 104. In other words, cloud-based resources 140 ordered by ERM 150 and allocated to hybrid cloud-based media production system 100, such as cloud bandwidth 144, cloud-based computing and data storage resources 146, cloud-based production applications 148, and any temporary licenses obtained by ERM 150, are relinquished back to the cloud host. Action 386 may be performed by software code 230, executed by hardware processor 222 of facility expansion platform 120/220, and using SDNO 106.

It is noted that, in some implementations, hardware processor 222 of facility expansion platform 120/220 may execute software code 230 to perform actions 381, 382, 383, 384, and 385, or actions 381, 382, 383, 384.385, and 386 in an automated process from which human involvement may be omitted.

It is further noted that, in some implementations, after processing of one or more cloud production media flows 142a into post-production cloud media flows 142b, post-production cloud media flows 142b may be converted into one or more post-production multicast media flows 132b. Once converted, one or more post-production media flows 132b may be returned to on-premises production environment 102, or one or more post-production media flows 132b may be transmitted to physical post-production facility 134. As noted above, physical post-production facility 134 may be another production facility similar to on-premises production environment 102, or may be a media distribution hub, such as a regional affiliate or other affiliated media distributor. Conversion of post-production cloud media flows 142b into one or more post-production multicast media flows 132b, as well as recovery or transmission of one or more post-production multicast media flows 132b, may be performed by software code 230, executed by hardware processor 222 of facility expansion platform 120/220, and using SDNO 106.

Figure 4:
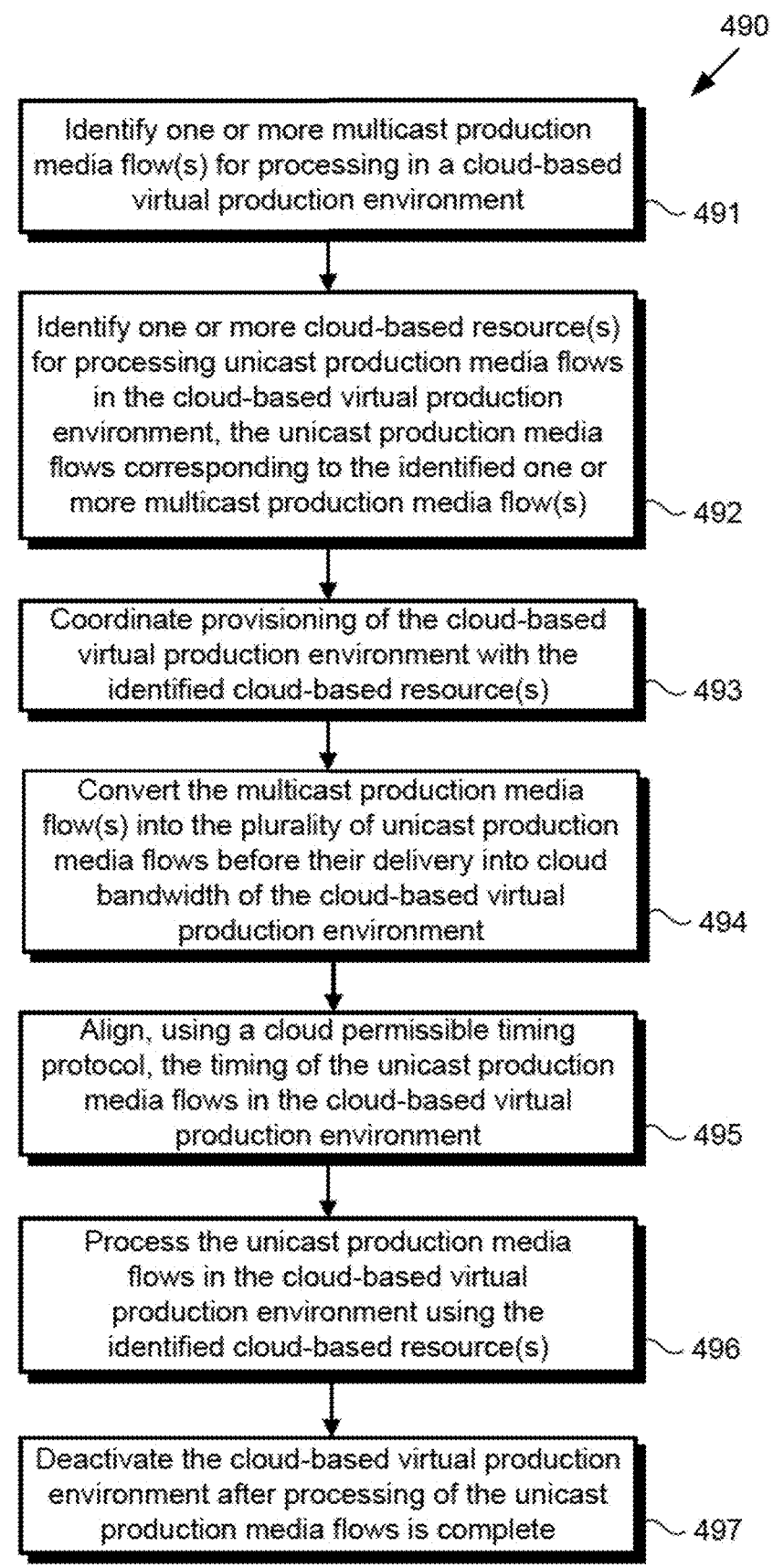
FIG. 4 shows a flowchart presenting an exemplary method for use by a system for performing hybrid cloud-based media production, according to another implementation.

FIG. 4 shows flowchart 490 presenting an exemplary method for use by a system for performing hybrid cloud-based media production, according to another implementation. With respect to the method outlined in FIG. 4, it is noted that certain details and features have been left out of flowchart 490 in order not to obscure the discussion of the inventive features in the present application. It is noted that the method outlined in FIG. 4 is directed to the exemplary use case in which a multicast production media flow is converted into a plurality of corresponding unicast production media flows for processing in a cloud-based virtual production environment.

Referring to FIGS. 1 and 4 in combination, flowchart 490 begins with identifying one or more multicast production media flows 132a for delivery into cloud-based virtual production environment 104 (action 491). As noted above, multicast production media flows 132a may include streaming audio content, streaming video content, streaming audio-video content, graphics, or one or more media files, to name a few examples. As also noted above, where multicast production media flows 132a include video, they may take the form of camera feeds or remote feeds, for example.

Action 491 may be triggered by workflow requirements, such as turnaround time or scheduling, by resource constraints imposed by local resources 110, or may be scheduled to occur at predetermined intervals (e.g., daily, weekly, monthly, etc.), for example. Referring to FIG. 2, with continued reference to FIGS. 1 and 4, action 491 may be performed by software code 230, executed by hardware processor 222 of facility expansion platform 120/220, and using SDNO 106.

As further noted above, where multicast production media flows 132a originate in on-premises production environment 102, the timing protocol applied to multicast production media flows 132a may be incompatible with timing schemes permitted in the cloud. For example, timing of multicast production media flows 132a may be controlled in on-premises production environment 102 using PTP, which is known in the art, but which is typically not permitted in cloud-based computing environments. However, and as also noted above, it is contemplated that cloud-based virtual production environment 104 may evolve to support use of PTP. Consequently, in some implementations one or more multicast production media flows 132a may have a timing protocol that is impermissible in cloud-based virtual production environment 104, while in other implementations the timing protocol used for one or more multicast production media flows 132a may be permitted in cloud-based virtual production environment 104.

Flowchart 490 continues with identifying one or more of cloud-based resources 140 for processing unicast production media flows 142a in cloud-based virtual production environment 104, where unicast production media flows 142a correspond to one or more multicast production media flows 132a identified in action 381 (action 492). Identification of cloud-based resources 140 needed to process unicast production media flows 142a may be performed by software code 230, executed by hardware processor 222 of facility expansion platform 120/220, and using SDNO 106.

Flowchart 490 continues with coordinating provisioning of cloud-based virtual production environment 104 with the one or more cloud-based resources 140 identified as needed for processing unicast production media flows 142a in action 492 (action 493). As discussed above, coordinating the provisioning of cloud-based virtual production environment 104 with cloud-based resources 140 may include one or more of reserving cloud bandwidth 144, ordering cloud-based computing and data storage resources 146, or ordering cloud-based production applications 148, for example. In addition, coordinating the provisioning of cloud-based resources 140 may include obtaining any licensing required for use of cloud-based resources 140. Action 493 may be performed by software code 230, executed by hardware processor 222 of facility expansion platform 120/220, and using ERM 150.

Flowchart 490 continues with converting one or more multicast production media flows 132a into corresponding plurality of unicast production media flows 142a before their delivery into cloud bandwidth 144 of cloud-based virtual production environment 104 (action 494). In some implementations, conversion of multicast production media flow(s) 132a into unicast production media flows 142a may be performed by software code 230, executed by hardware processor 222 of facility expansion platform 120/220, and using SDNO 106.

It is noted that although flowchart 490 shows action 493 being followed by action 494, that representation is merely by way of example. In other implementations, action 494 may precede action 493. Moreover, in some implementations, actions 493 and 494 may be performed substantially concurrently.

Flowchart 490 continues with aligning unicast production media flows 142a using a cloud permissible timing protocol, in cloud-based virtual production environment 104 (action 495). As noted above, in on-premises production environment 102, PTP may be used in media-over-IP to align multicast production media flow(s) 132a. In order to achieve analogous timing in cloud-based virtual production environment 104 in implementations in which use of PTP is not permitted there, unicast production media flows 142a must be buffered, as well as being timed using a cloud permissible timing protocol, such as NTP for example.

As noted above, as production media flows are converted from multicast production media flow(s) 132a to unicast production media flows 142a, they may come through different network paths, resulting in wander and jitter that causes unicast production media flows 142a to move out of time with one another. Because production processing of unicast production media flows 142a is to be performed in cloud-based virtual production environment 104, alignment of unicast production media flows 142a in action 495 must typically be done after their delivery into cloud-based virtual production environment 104. Alignment of unicast production media flows 142a using a cloud permissible timing protocol may be performed by software code 230, executed by hardware processor 222 of facility extension platform 120/220, and using SDNO 106.

Flowchart 490 continues with processing unicast production media flows 142a in cloud-based virtual production environment 104 using the one or more cloud-based resources 140 identified in action 492, resulting in post-production unicast media flows 142b (action 496). Processing of unicast production media flows 142a in cloud-based virtual production environment 104 may be performed by software code 230, executed by hardware processor 222 of facility expansion platform 120/220, and using SDNO 106.

In some implementations, the method outlined by flowchart 490 may conclude with action 496 described above. However, and as shown in FIG. 4, in other implementations, flowchart 490 can continue and conclude with deactivating cloud-based virtual production environment 104 after processing of unicast production media flows 142a is complete (action 497). Action 497 results in effective withdrawal of hybrid cloud-based media production system 100 from cloud-based virtual production environment 104. In other words, cloud-based resources 140 ordered by ERM 150 and allocated to hybrid cloud-based media production system 100, such as cloud bandwidth 144, cloud-based computing and data storage resources 146, cloud-based production applications 148, and any temporary licenses obtained by ERM 150, are relinquished back to the cloud host. Action 497 may be performed by software code 230, executed by hardware processor 222 of facility expansion platform 120/220, and using SDNO 106.

It is noted that, in some implementations, hardware processor 222 of facility expansion platform 120/220 may execute software code 230 to perform actions 491, 492, 493, 494, 495, and 496, or actions 491, 492, 493, 494, 495, 496, and 497 in an automated process from which human involvement may be omitted.

It is further noted that, in some implementations, after processing of unicast production media flows 142a into post-production unicast media flows 142b, post-production unicast media flows 142b may be converted into one or more post-production multicast media flows 132b. Once converted, one or more post-production media flows 132b may be returned to on-premises production environment 102, or one or more post-production media flows 132b may be transmitted to physical post-production facility 134. As noted above, physical post-production facility 134 may be another production facility similar to on-premises production environment 102, or may be a media distribution hub, such as a regional affiliate or other affiliated media distributor. Conversion of post-production unicast media flows 142b into one or more post-production multicast media flows 132b, as well as recovery or transmission of one or more post-production multicast media flows 132b, may be performed by software code 230, executed by hardware processor 222 of facility expansion platform 120/220, and using SDNO 106.

Thus, the present application describes a hybrid cloud-based media production solution that addresses and overcomes the drawbacks and deficiencies in the conventional art. The solutions disclosed in the present application can provide a true hybrid production environment that is advantageously able to scale to a much greater resource capability than is available locally. Media applications used in the production process would look the same regardless of whether they are local resources or cloud-based resources. The disclosed ERM may be utilized to manage and allocate the added resources needed when they are not local. The disclosed SDNO provides the conversion, presentation, and allocation of all media-over-IP flows while also managing cloud bandwidth.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A hybrid cloud-based media production system comprising:
   a plurality of media production hardware resources including a facility extension platform having a hardware processor and a memory storing a software code;
   the hardware processor configured to execute the software code to:
      identify at least one multicast production media flow for processing in a cloud-based virtual production environment;
      identify at least one cloud-based resource for processing a plurality of unicast production media flows in the cloud-based virtual production environment, the the plurality of unicast production media flows corresponding to the identified at least one multicast production media flow;
      coordinate provisioning of the cloud-based virtual production environment with the identified at least one cloud-based resource;
      convert the at least one multicast production media flow into the plurality of unicast production media flows before delivery of the plurality of unicast production media flows into a cloud bandwidth of the cloud-based virtual production environment;
      align, using a cloud permissible timing protocol, a timing of the plurality of unicast production media flows in the cloud-based virtual production environment; and
      process the plurality of unicast production media flows in the cloud-based virtual production environment using the identified at least one cloud-based resource, resulting in a plurality of post-production unicast media flows.

2. The hybrid cloud-based media production system of claim 1, wherein the hardware processor is configured to further execute the software code to:
   deactivate the cloud-based virtual production environment after processing of the plurality of unicast production media flows is complete.

3. The hybrid cloud-based media production system of claim 2, wherein deactivating the cloud-based virtual production environment comprises relinquishing the identified at least one cloud-based resource.

4. The hybrid cloud-based media production system of claim 1, wherein the hardware processor is configured to further execute the software code to:
   convert the plurality of post-production unicast media flows into a corresponding at least one post-production multicast media flow after processing of the plurality of unicast production media flows is complete.

5. The hybrid cloud-based media production system of claim 1, wherein the identified at least one multicast production media flow comprises at least one of streaming audio content, streaming video content, streaming audio-video content, graphics, or one or more media files.

6. The hybrid cloud-based media production system of claim 1, wherein a timing protocol of the identified at least one multicast production media flow is Precision Time Protocol (PTP).

7. The hybrid cloud-based media production system of claim 1, wherein the cloud permissible timing protocol is Network Time Protocol (NTP).

8. A method for use by a facility extension platform of a hybrid cloud-based media production system, the facility extension platform having a hardware processor and a memory storing a software code, the method comprising:
   identifying, by the software code executed by the hardware processor, at least one multicast production media flow for processing in a cloud-based virtual production environment;
   identifying, by the software code executed by the hardware processor, at least one cloud-based resource for processing one or more cloud production media flows in the cloud-based virtual production environment, the one or more cloud production media flows corresponding to the identified at least one multicast production media flow;
   coordinating, by the software code executed by the hardware processor, provisioning of the cloud-based virtual production environment with the identified at least one cloud-based resource;
   aligning, by the software code executed by the hardware processor and using a cloud permissible timing protocol, a timing of the one or more cloud production media flows in the cloud-based virtual production environment;
   processing, by the software code executed by the hardware processor, the one or more cloud production media flows in the cloud-based virtual production environment using the identified at least one cloud-based resource, resulting in one or more post-production cloud media flows; and
   deactivating, by the software code executed by the hardware processor, the cloud-based virtual production environment after processing the one or more cloud production media flows is complete.

9. The method of claim 8, wherein deactivating the cloud-based virtual production environment comprises relinquishing the identified at least one cloud-based resource.

10. The method of claim 8, wherein the identified at least one multicast production media flow comprises at least one of streaming audio content, streaming video content, streaming audio-video content, graphics, or one or more media files.

11. The method of claim 8, wherein a timing protocol of the identified at least one multicast production media flow is Precision Time Protocol (PTP).

12. The method of claim 8, wherein the cloud permissible timing protocol is Network Time Protocol (NTP).

13. A method for use by a facility extension platform of a hybrid cloud-based media production system, the facility extension platform having a hardware processor and a memory storing a software code, the method comprising:
   identifying, by the software code executed by the hardware processor, at least one multicast production media flow for processing in a cloud-based virtual production environment;
   identifying, by the software code executed by the hardware processor, at least one cloud-based resource for processing a plurality of unicast production media flows in the cloud-based virtual production environment, the plurality of unicast production media flows corresponding to the identified at least one multicast production media flow;

coordinating, by the software code executed by the hardware processor, provisioning of the cloud-based virtual production environment with the identified at least one cloud-based resource;

converting the at least one multicast production media flow into the plurality of unicast production media flows, by the software code executed by the hardware processor, before delivery of the plurality of unicast production media flows into a cloud bandwidth of the cloud-based virtual production environment;

aligning, by the software code executed by the hardware processor and using a cloud permissible timing protocol, a timing of the plurality of unicast production media flows in the cloud-based virtual production environment; and processing, by the software code executed by the hardware processor, the plurality of unicast production media flows in the cloud-based virtual production environment using the identified at least one cloud-based resource, resulting in a plurality of post-production unicast media flows.

14. The method of claim 13, further comprising:
deactivating the cloud-based virtual production environment, by the software code executed by the hardware processor, after processing of the plurality of unicast production media flows is complete.

15. The method of claim 14, wherein deactivating the cloud-based virtual production environment comprises relinquishing the identified at least one cloud-based resource.

16. The method of claim 13, further comprising:
converting the plurality of post-production unicast media flows into a corresponding at least one post-production multicast media flow, by the software code executed by the hardware processor, after processing of the plurality of unicast production media flows is complete.

17. The method of claim 13, wherein the identified at least one multicast production media flow comprises at least one of streaming audio content, streaming video content, streaming audio-video content, graphics, or one or more media files.

18. The method of claim 13, wherein a timing protocol of the identified at least one multicast production media flow is Precision Time Protocol (PTP).

19. The method of claim 13, wherein the cloud permissible timing protocol is Network Time Protocol (NTP).

20. The method of claim 13, wherein converting includes one of aliasing or performing a Network Address Translation (NAT) to convert the at least one multicast production media flow into the plurality of unicast production media flows.

* * * * *